United States Patent
Chandler et al.

(10) Patent No.: US 6,236,375 B1
(45) Date of Patent: May 22, 2001

(54) COMPACT OFFSET GREGORIAN ANTENNA SYSTEM FOR PROVIDING ADJACENT, HIGH GAIN, ANTENNA BEAMS

(75) Inventors: Charles W. Chandler, San Gabriel; Gregory P. Junker, El Segundo; Ann L. Peebles, Santa Monica, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/232,450

(22) Filed: Jan. 15, 1999

(51) Int. Cl.$^7$ .................................................. H01Q 19/19
(52) U.S. Cl. ...................... 343/781 P; 343/779; 343/836; 343/DIG. 2
(58) Field of Search ................................. 343/779, 781 P, 343/781 CA, 836, DIG. 2; H01Q 19/12, 15/16, 19/19

(56) References Cited

U.S. PATENT DOCUMENTS

| | | | |
|---|---|---|---|
| 4,355,314 | 10/1982 | Ohm | 343/781 P |
| 4,755,826 | 7/1988 | Rao | 343/781 P |
| 5,322,413 | 6/1994 | Lenormand | 343/781 P |

FOREIGN PATENT DOCUMENTS 0638956 2/1995 (FR).

OTHER PUBLICATIONS

Rolf Jorgensen et al., "Dual Offset Reflector Multibeam Antenna for International Communications Satellite Applications," Dec. 1985, IEEE Transactions On Antennas And Propagation, vol. AP–33, No. 12.

*Primary Examiner*—Michael C. Wimer
(74) *Attorney, Agent, or Firm*—Michael S. Yatsko; Connie M. Thousand

(57) ABSTRACT

An antenna system comprising a feed array, a subreflector and a main reflector which are oriented to define a offset gregorian antenna geometry. The feed array is comprised of a plurality of separate feeds which are aligned on a predetermined contour. Each feed array is coupled to a feed network which acts to combine the illumination beams of clusters of a preselected number of feeds to produce a plurality of composite illumination beams. Each composite illumination beam is directed to be incident upon a separate predetermined location on the subreflector which directs the composite illumination beams and directed towards the main reflector. Each composite illumination beam is reflected by the main reflector in a preselected direction so that each composite illumination beam forms an antenna beam that impinges a predetermined coverage area on the Earth. Each antenna beam defines a separate coverage cell in the coverage area, wherein the position and orientation of the feeds, the subreflector and the main reflector provides antenna beams over a full Earth field of view coverage area where each antenna beam is approximately symmetrically shaped.

20 Claims, 5 Drawing Sheets

COMPACT OFFSET GREGORIAN ANTENNA SYSTEM FOR PROVIDING ADJACENT, HIGH GAIN, ANTENNA BEAMS

CROSS-REFERENCE TO RELATED APPLICATIONS

This application is related to three commonly assigned applications entitled: "A Compact Folded Optics Antenna System For Providing Adjacent, High Gain Antenna Beams", U.S. patent application Ser. No. 09/232,454, having inventors Romulo F. Jimenez Broas, David L. Brundrett, Charles W. Chandler and Te-Kao Wu; "A Compact Side-Fed Dual Reflector Antenna System For Providing Adjacent, High Gain Antenna Beams", U.S. patent application Ser. No. 09/232,452, having inventors Ann L. Peebles, Charles W. Chandler and Louis C. Wilson; and, "A Compact Front-Fed Dual Reflector Antenna System For Providing Adjacent, High Gain Antenna Beams", U.S. patent application Ser. No. 09/232,448, having inventors Charles W. Chandler and Ann L. Peebles; filed on the same date as this application. These applications are incorporated herein by reference in their entirety.

BACKGROUND OF THE INVENTION

The present invention relates generally to antennas for satellites and more particularly, to a reflector antenna system for a satellite which provides a plurality of antenna beams for full Earth field-of-view coverage from a geosynchronous orbit with each antenna beam having approximately equivalent beam characteristics and being substantially symmetrically shaped.

Communications satellites in a geosynchronous orbit require high gain antennas for uplink and downlink communications with the Earth. A satellite uplink communications signal is transmitted to a satellite from one or more ground stations located on the Earth; and, a satellite downlink communications signal is transmitted from a satellite to one or more ground stations located on the Earth. The uplink and downlink signals are received and transmitted respectively at a particular frequency bands which are typically in the ratio of about 3:2 (uplink frequency band:downlink frequency band) for Ka band. The signals are also typically coded. A satellite is equipped with antennas or antenna systems to receive and transmit the uplink and downlink signals respectively. To minimize the number of satellites in a constellation and maximize communications capabilities, it is desirable for each satellite to have the capability to communicate with the locations on the Earth within the satellite's field of view and to do so with high gain antenna beams.

FIG. 1 shows a simplified plan view of one antenna 10 used for high gain communications from satellites. This antenna 10 was detailed in the article Jorgensen, Rolf, et. al., "A Dual Offset Reflector Multibeam Antenna for International Communications Satellite Applications", IEEE Transactions on Antennas and Propagation, Vol. AP-33, No. 12, Dec. 1985. The antenna 10 is an offset gregorian antenna having a main reflector 11, a subreflector 12 and a feed array 13. The feed array 13 consists of multiple feed horns with each feed horn generating an illumination beam 14 which is reflected from the subreflector 12 and main reflector 11 and directed toward a defined coverage cell on the Earth. The disadvantage with this antenna 10 is that it does not provide symmetrically shaped beams at wide scan angles.

The antenna 10 disclosed above has the additional disadvantage that it cannot provide high gain, adjacently located antenna beams. The above antenna 10 provides a single beam from each feed horn in the feed array 13. To provide high gain beams, the main reflector 11 must be efficiently illuminated. To do so requires large feed horns, with the location of each feed horn determining the location of a corresponding beam on the Earth. To provide beams which are adjacently located and completely cover the Earth's field-of-view requires that all the feeds in the feed horn array 13 be physically positioned close together. If the feeds are not physically close together, the corresponding antenna beams will not be adjacently located and will be spaced too far apart on the Earth, with locations between antenna beams having no coverage. Large feed horns typically cannot be physically spaced close enough together within the antenna 10 to produce adjacent beams on the Earth. The above referenced antenna attempts to address this problem by using feed horns which are physically small so that the feed horns can be physically spaced close together. These smaller feed horns can produce adjacent beams but do not efficiently illuminate the reflectors 12, 11 resulting in high spillover losses and lower gain beams.

What is needed therefore is an efficient antenna system that provides a plurality of high gain, adjacent located antenna beams which cover the entire Earth field-of-view.

SUMMARY OF THE INVENTION

The preceding and other shortcomings of the prior art are addressed and overcome by the present invention which provides an antenna system for use on a spacecraft. In a first aspect, the antenna system comprises a feed array, a subreflector and a main reflector which are oriented to define an offset gregorian antenna geometry where the feed array is offset from both the subreflector and the main reflector.

The feed array is comprised of a plurality of separate feeds which are aligned along a predetermined contour. Each feed is coupled to a feed network which acts to combine the illumination beams of clusters of a preselected number of feeds to produce a plurality of composite illumination beams, each of which has a central ray. The central ray of each composite illumination beam is directed to be incident upon a separate preselected location on the subreflector. The subreflector is configured to receive each composite illumination beam at the preselected location and direct the central ray of each composite illumination beam towards the main reflector.

The main reflector is positioned to receive each composite illumination beam from the subreflector and direct each composite illumination beam in a preselected direction so that each composite illumination beam forms an antenna beam that impinges a predetermined coverage area on the Earth. Each antenna beam defines a separate contiguous coverage cell within a preselected coverage area.

In a second aspect, the position and orientation of the feeds, the subreflector and the main reflector provides adjacent antenna beams over a full Earth field of view coverage area where each antenna beam is approximately symmetrically shaped.

In a third aspect, the antenna system comprises a plurality of subreflector and main reflector combinations and a feed array associated with each subreflector and main reflector combination. Each subreflector and main reflector combination and associated feed array is oriented to define a separate offset gregorian antenna geometry with each subreflector and main reflector combination and associated feed array together comprising a single offset gregorian antenna.

Each feed array generates a plurality of illumination beams which form a plurality of associated antenna beams therefrom. The antenna beams from all the offset gregorian antennas within the antenna system are interleaved. Each antenna beam defines a separate coverage cell in a coverage area with the coverage cells being arranged so that no coverage cell defined by an antenna beam associated with one offset gregorian antenna is contiguous with another coverage cell defined by another antenna beam associated with the same offset gregorian antenna.

BRIEF DESCRIPTION OF THE DRAWINGS

Reference is now made to the detailed description of the preferred embodiments illustrated in the accompanying drawings, in which.

DETAILED DESCRIPTION OF THE PREFERRED EMBODIMENTS

Figure 1:
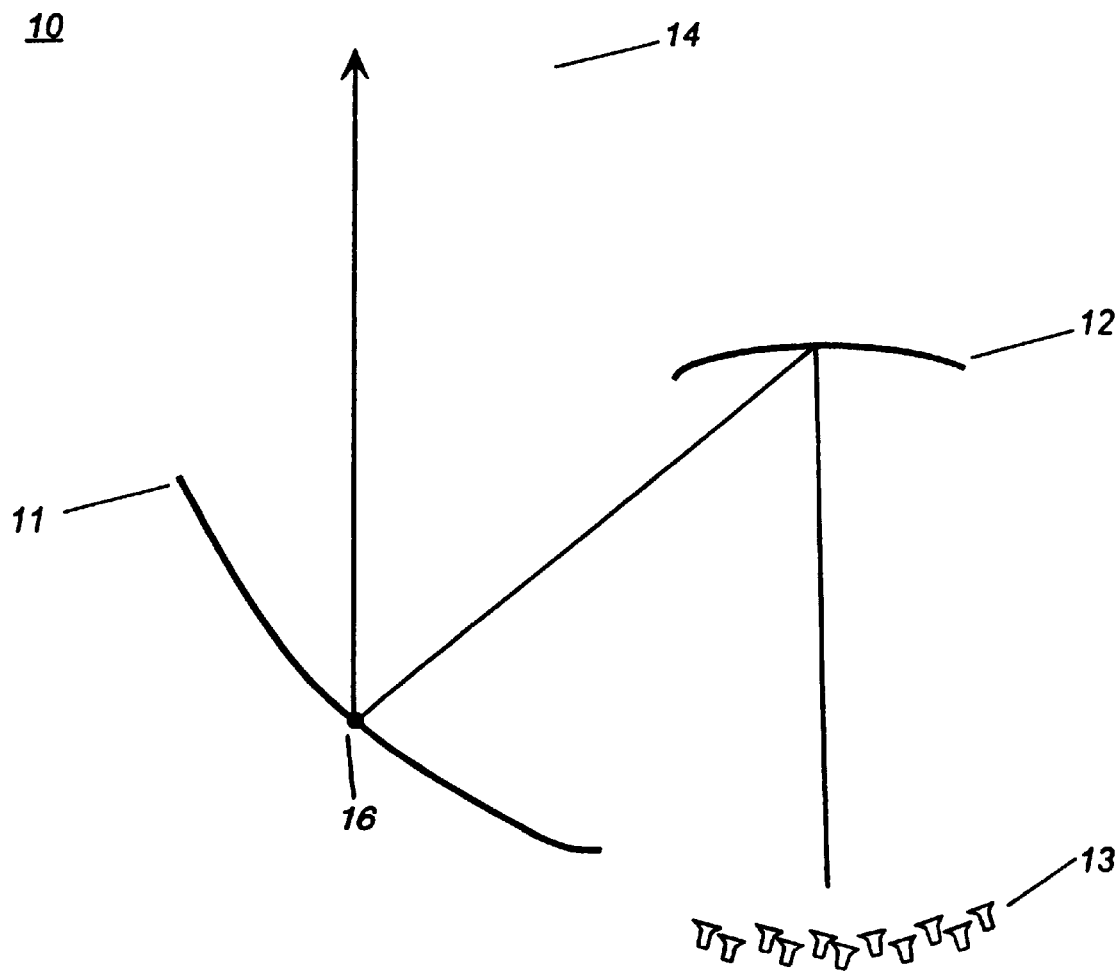
FIG. 1 is a prior art offset gregorian antenna.
Figure 2:
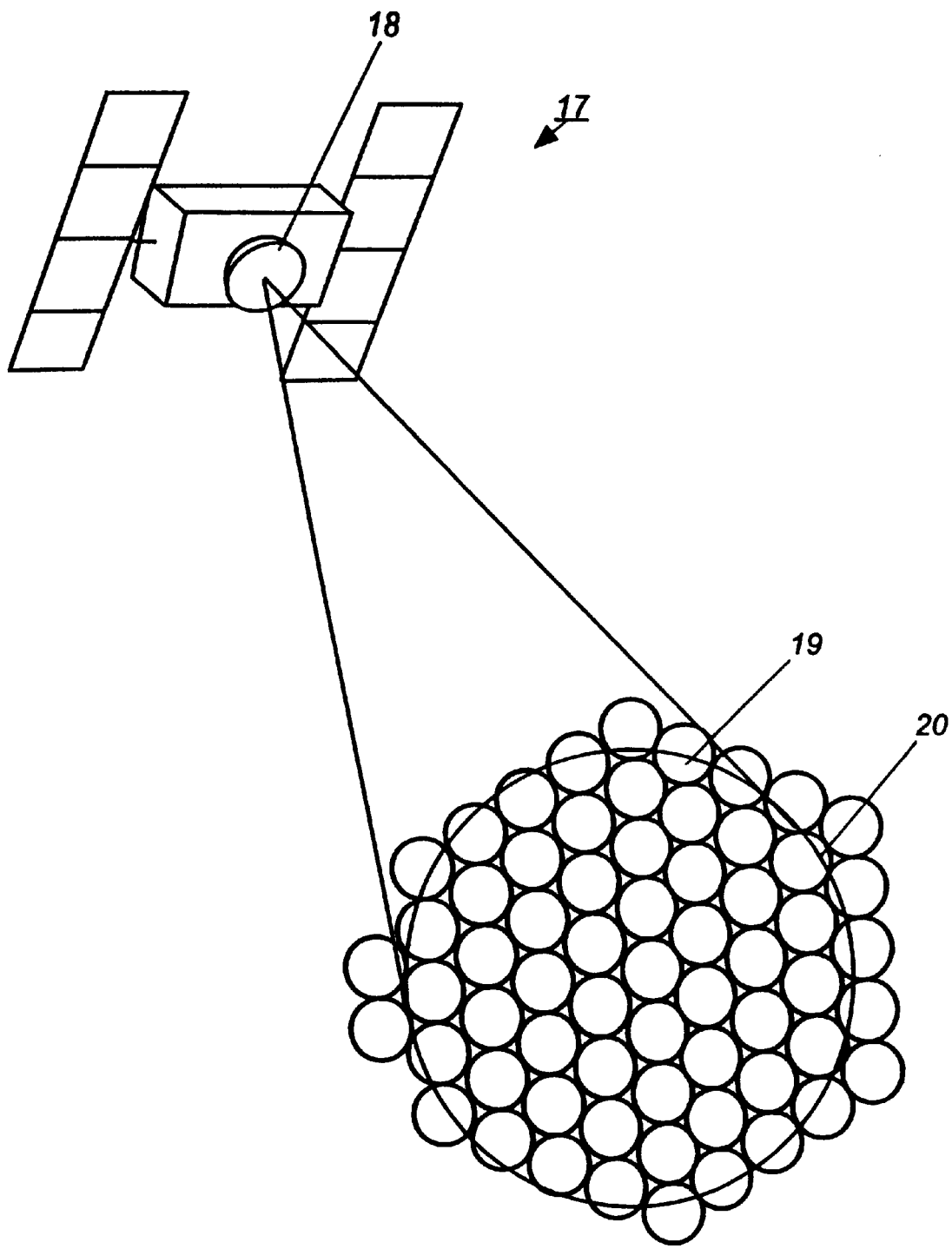
FIG. 2 is an isometric drawing showing a satellite having an offset gregorian antenna system in accordance with the present invention.

Referring to FIG. 2, a spacecraft 17 having an antenna system 18 for providing adjacent high gain antenna beams 19 on Earth 20 is illustrated. The antenna system 18 of the present invention is used for communications between the spacecraft 17 and the Earth 20 where the spacecraft 17 is preferably located in a geosynchronous or near geosynchronous orbit. The antenna system 18 provides symmetrically shaped adjacent antenna beams 19 on the Earth 20 from a single spacecraft 17.

Figure 3:
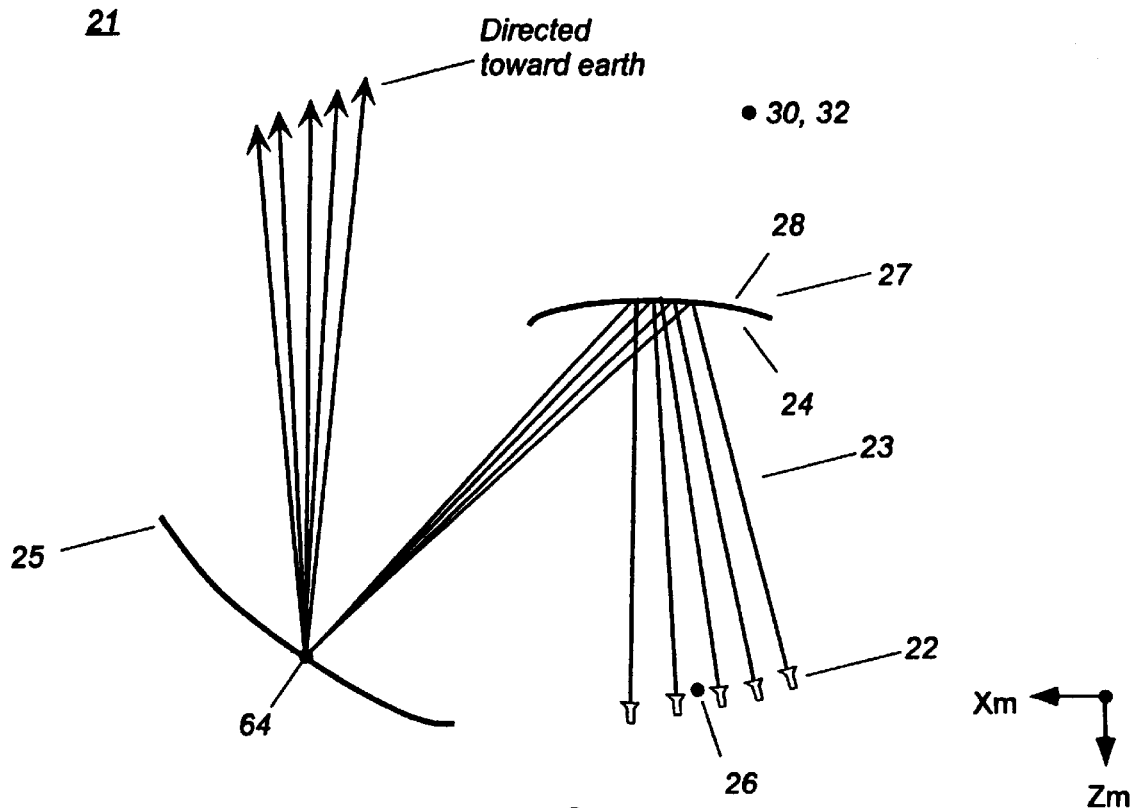
FIG. 3 is a side plane view of an offset gregorian antenna system in accordance with a first embodiment of the invention.

Referring to FIG. 3, for a first embodiment of the invention, the antenna system 21 is comprised of a main reflector 25, a subreflector 27 and a feed array 22 configured in an offset gregorian antenna configuration so that the illumination beams, depicted by the lines marked 23, provided by the feed array 22 are reflected towards Earth from the main reflector 25 in a compact manner which is substantially or totally free of blockage by the subreflector 27 or feed array 22. A more detailed discussion of offset gregorian antenna configurations can be found in the article Jorgenson et. al. "Development of dual reflector multibeam spacecraft antenna system," IEEE Transactions of Antennas and Propagation, vol. AP-32, pp. 30–35, 1984. The location of the feed array 22 offset from the subreflector 27 and main reflector 25 define the antenna system 21 as being "offset". For the preferred embodiment of the invention, the subreflector 27 is a portion of a hyperbola which has a concave side 24 with an associated focal point 26 and a convex side 28 with an associated focal point 30. The main reflector 25 is a portion of a parabola having a main reflector focal point 32. The subreflector 27 and main reflector 25 are positioned so that the focal point 32 of the main reflector 25 is approximately coincident with the focal point 30 associated with the convex side 28 of the subreflector 27. The feed array 22 is placed in the proximity of the first focal point 26 associated with the concave side 24 of the subreflector 27 with the exact location of each feed in the array 22 being determined as detailed below. The antenna system 21 is configured so that the illumination beams 23 are incident on the concave side 24 of the subreflector 27, redirected towards the main reflector 25, and, directed towards the Earth free of blockage by the subreflector 27 or feed array 22.

The offset gregorian configuration provides an optical system having a long effective focal length in a compact structure. A relatively long effective focal length of the optical system ensures low beam squint and virtually distortionless scanning to wide scan angles. Coupling a subreflector 27 with the main reflector 25 in an offset gregorian configuration enables an optical system to be packaged into an extremely small envelope while providing an antenna 21 free of blockage. Table 1 below gives an example of the parameters of the subreflector 27 and the main reflector 25 for the offset gregorian configuration in accordance with the invention. The main reflector coordinate system is defined by the axes XmZm as shown in FIG. 3.

TABLE I

| Reflector | Subreflector | Minimum Spotsize |
|---|---|---|
| Eccentricity 1.0 | Eccentricity 0.385882 | .0° x, z = 13.21, 56.88λ |
| Focal Length 53.3276λ | Focal Length 46.4924λ | 11.2° x, z = 5.94, 50.89λ |
| Rotation 0° | Rotation –166.923° | –11.2° x, z = 48.57, 72.18λ |
| Xmin, Zmin = 16.79, –51.87λ | Xmin, Zmin = –72.35, –4.64λ | |
| Xmax, Zmax = 74.89, –27.03λ | Zmin, Zmax = 3.62, 46.97λ | Overall Box Size |
| Xo, Zo = 0.00, –53.32λ | Xo, Zo = 10.52, 45.30λ | X, Z = 147.24, 68.64λ |

The geometry and configuration of select feeds in the feed array 22, the subreflector 27 and the main reflector 25 discussed above preferably satisfy the cross-polarization cancellation condition, $$\tan\frac{\gamma}{2} = \frac{1}{M} \times \tan\frac{\varphi}{2}$$

where γ is the angle from the main reflector axis to the subreflector axis, φ is the angle from the subreflector axis to the focal axis, and M is the magnification factor.

Figure 4:
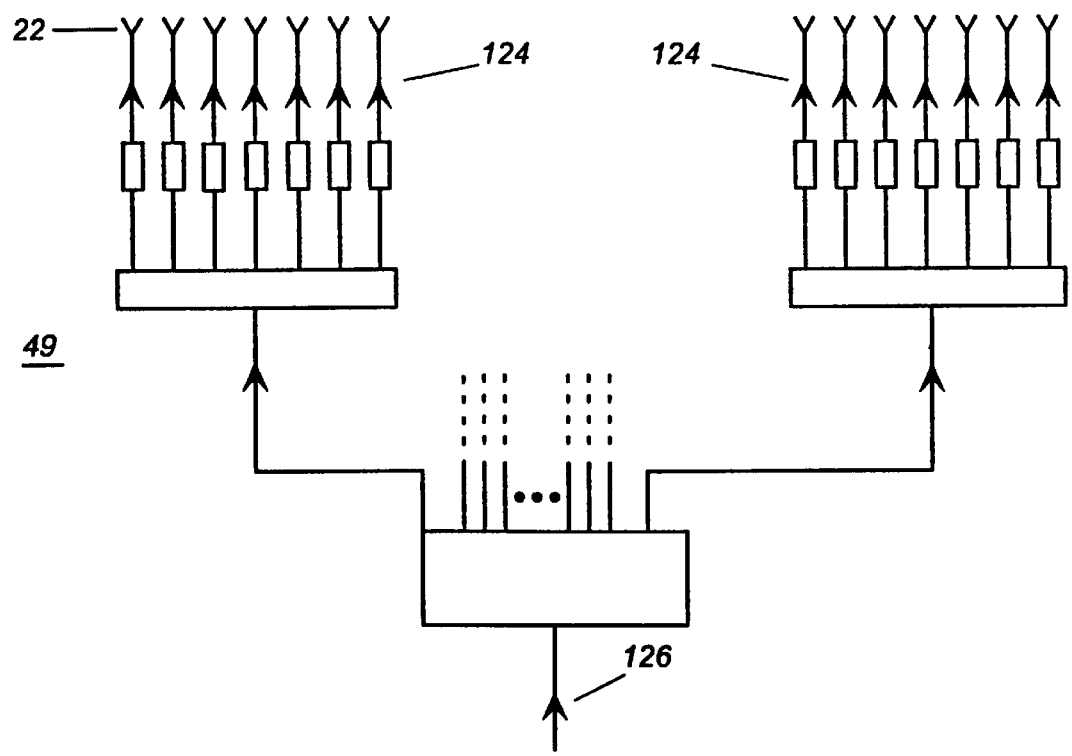
FIG. 4 is a schematic drawing of a feed network used in the offset gregorian antenna system shown in FIG. 3.

Referring to FIGS. 3 and 4, the feed array 22 is comprised of a plurality of feeds. A practical feed array 22 contains many feeds, however, for illustration purposes, only five feeds of the feed array are shown in FIG. 3. Each feed in the feed array 22 is coupled to a feed network 49 which provides a plurality of feed signals to the feeds to produce a plurality of illumination beams 23 (FIG. 3). The feeds can have any desirable configuration, such as circular, square, hexagonal and the like appropriate for a particular application. As will be subsequently discussed, the signal intensity and phase of each feed signal is preselected to produce illumination beams 23 having desirable beam characteristics. In addition, the feed signals are selectively provided to the feeds either separately or in combination depending on the particular application and the desired coverage area.

Each feed in the feed array 22 is positioned so that the central ray of each illumination beam 23 is incident on a separate preselected location on the subreflector 27. According to the present invention shown in FIG. 3, the central ray of each illumination beam 23 is directed towards a preselected location on the subreflector 27, thus, the subreflector 27 is oversized and approximately 50–150 wavelengths at the frequency of operation of the antenna system to accommodate the desired location of each illumination beam 23 on the subreflector 27. For the preferred embodiment of the invention, the subreflector 27 is configured to direct each illumination beam 23 towards the main reflector 25 so that the central ray of each illumination beam 23 is incident on the center 64 of the main reflector 25. As a result, a circularly symmetrical illumination on the main reflector 25 is obtained and nearly circularly symmetric antenna beams 19 (FIG. 2) can be achieved, even when the antenna beam is scanned more than thirteen beamwidths away from the antenna 21 boresight. For example, computer simulations have shown that antenna beams can be created over the entire EFOV where each antenna beam has a level of −6 dB±0.5 dB relative to the peak signal level occurring within approximately 0.45 degrees ±0.05 degrees of the peak signal location of each antenna beam.

The position, orientation and pointing direction of each feed in the feed array 22 relative to the subreflector 27 and the main reflector 25 determines the location of each antenna beam 19 (FIG. 2) on the Earth 20. For a first embodiment of the invention, the feed array 22 is comprised of a plurality of feeds each of which is placed in a predetermined location and orientation and which are then combined in groups of seven to provide antenna beams over approximately ±8.7 degrees. As an example, the feed array 22 may include about 700 feeds that provide approximately 650 antenna beams covering an approximately 8.7 degree half-cone angle thereby covering the full extent of EFOV from a satellite in a geosynchronous orbit.

In prior art antenna designs, the feeds in a feed array 22 would be oriented relative to each other along a focal plane which is perpendicular to the propagation direction of the boresight or center beam to achieve the desirable pointing direction. Computer simulations have shown that locating the feeds on a common plane will not provide symmetrical antenna beams over the entire EFOV. Therefore, according to the present invention, each feed in the feed array 22 is positioned relative to each other on a predetermined contour rather than on a common plane. Computer simulations have shown that by locating the feeds at predetermined locations on a predetermined contour, adjacent, symmetrically shaped antenna beams can be created over the entire EFOV.

To determine the proper location for each feed in the feed array 22, an optical ray-tracing program is used. The desired location of each antenna beam 19 (FIG. 2) on the Earth 20 is preselected and input into the ray tracing program. The desired location of the phase center and the pointing angle of each feed is then output from the program. This information is then input into an antenna analysis computer code which calculates the beam characteristics such as gain, beam shape, sidelobe level and beamwidth. of each antenna beam. These antenna beams are examined to determine if the beams have the desired characteristics such as gain, beam shape, sidelobe level, and beamwidth. If so, the locations of the feeds are output from the ray tracing program. If the antenna beams do not occur at the desired locations with the desired performance characteristics, the location of the feeds require adjustment. The locations of the feeds are then incrementally adjusted and input into the antenna analysis program. The process is continued until the beams occur in the predetermined locations with the desired beam characteristics. Once the antenna beams occur in the predetermined locations with the desired beam characteristics, the locations of the phase centers of feeds and the pointing angle of the feeds which is used to manufacture the resulting antenna are output from the ray tracing program.

Figure 5:
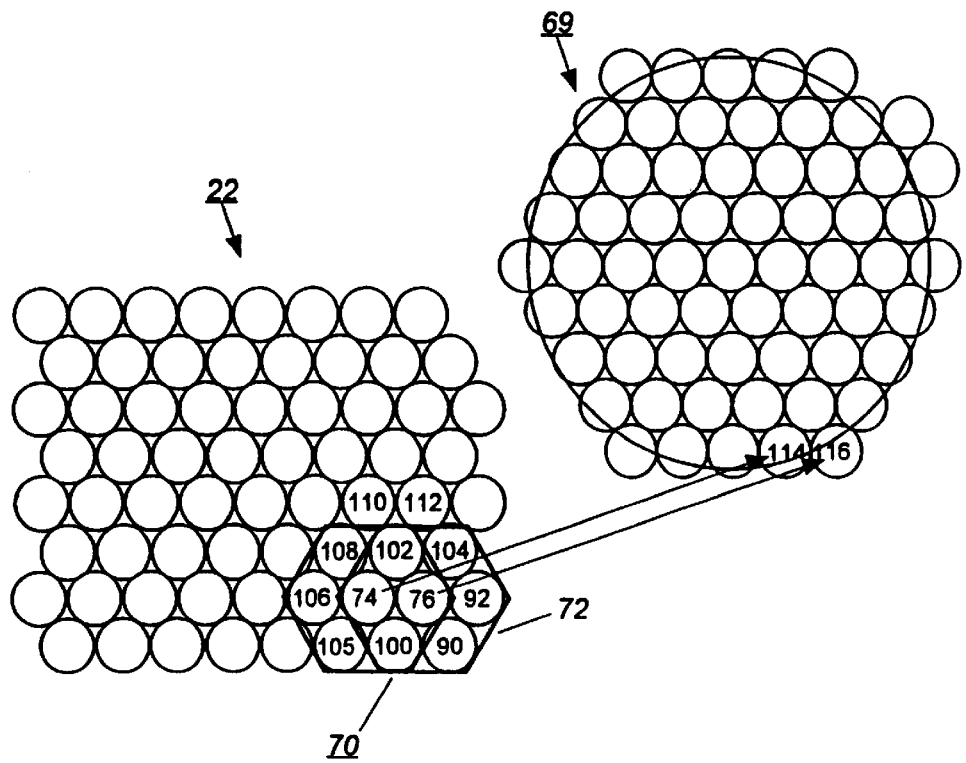
FIG. 5 is an illustration of a feed array used in the offset gregorian antenna system shown in FIG. 3 and antenna beams generated therefrom.

Referring to FIGS. 3 and 5 for the preferred embodiment of the invention, each illumination beam 23, and thus, each antenna beam 69 is generated by a selected plurality of feeds within the feed array 22. For one embodiment of the invention, each illumination beam 23 and corresponding antenna beam 69 is generated by a cluster of seven feeds, such as clusters 70, 72, configured so that one of the feeds in the cluster is the central feed and the remaining six feeds in the cluster surround the central feed. For cluster 70, the central feed is feed 74 and for cluster 72, the central feed is feed 76. Feeds in the feed array 22 can be shared by more than one cluster. For example, feed 76 can simultaneously be shared by three different feed clusters, the first of which comprises central feed horn 76 and surrounding feeds 74, 90, 92,100,102 and 104, the second of which is comprised of central feed 74 and surrounding feeds 76,100,102,105, 106 and 108, the third of which comprises central feed 102 and surrounding feeds 74, 76, 104, 108, 110 and 112.

The feeds in a cluster combine to approximate a single feed to produce a single composite illumination beam 23 which, when directed towards the Earth by the offset gregorian antenna system 21, creates a single antenna beam 69 that defines a single coverage cell on the Earth. Each antenna beam 69 is associated with a different feed cluster with the location of each antenna beam 69 being determined by the location of the phase center of a cluster producing the respective antenna beam. Clusters having adjacent central feeds will produce adjacent antenna beams. For example, adjacent antenna beams 114, 116 are created by clusters 70, 72 respectively which have adjacent central feed horns 74, 76 respectively. In this embodiment, clusters of feeds are combined to define single antenna beams because of the size of the feeds and the size of the desired coverage area for existing satellite systems. Particularly, if single feed horns were used to provide antenna beams 69 of the same gain and beamwidth characteristics as that provided by the feed clusters, the single feed horns would not be able to be positioned close enough together in a single offset gregorian antenna to provide adjacent, high gain antenna beams 69 on the Earth. For example, a single feed horn having a diameter of 5.6$\lambda$ would be required to provide the same antenna beam 114 as that provided by the feed cluster 70. In contrast each feed in a cluster 70 has a diameter of 2.8$\lambda$. By producing each composite illumination beam from a plurality of feeds, each composite illumination beam and corresponding antenna beam 69 appears to have been created by a physically large feed so that higher gain antenna beams can be created than that created by the prior art. Clusters of more than seven feed horns can also be used depending on the gain, beamwidth and number of beams desired. If antenna beams of predetermined shapes are desired, each feed cluster can be comprised of a preselected number of feeds to produce antenna beams of a desired shape.

Referring to FIGS. 4 and 5, to provide downlink antenna beams, the feed network 49 provides the feeds in the feed array 22 with feed signals 124 to create composite illumination beams 23 (FIG. 3) having the desired beam characteristics which will produce antenna beams 69 which are symmetrically shaped. The feed network 49 divides an input signal 126 into a plurality of feed signals 124 and weights the feed signals 124 with predetermined signal intensities and phases. To provide antenna beams 69 having approximately the same gain and being approximately symmetrical in shape, each central feed in a cluster is provided with a feed signal 124 having a relatively high signal level intensity, and, the six surrounding feeds in a cluster are each provided with approximately equal strength feed signals 124 each of a lower signal strength than that provided to the central feed horn. The feed signals 124 input to the feeds are also phase delayed relative to each other by a predetermined amount so that each individual feed generates an illumination beam having the proper phase to create composite illumination beams and corresponding antenna beams 69 having good beam symmetry. The phase delaying can be accomplished with fixed or variable phase shifters. For simplicity, fixed value phase shifters in the form of different lengths of transmission lines may be used to create the desired phase delays. The weighting and phasing of the feed signals 124 can be conducted in such a manner as to provide feed signals 124 which produce antenna beams having lower sidelobes than that of a single antenna feed. Lower sidelobes provide less interference with adjacent antenna beams 114, 116. If the feed signals 124 are provided to different clusters at different times, the corresponding antenna beams 69 will be created at different times such that the antenna beams 69 scan over the EFOV. Alternatively, if the feed signals 124 are provided to different clusters at the same time, continuous adjacent antenna beams 69 are created over the entire EFOV. By selectively controlling each of the feed signals 124, the antenna feeds in a feed array 22 can be selectively activated to control the beam coverage area. The same concept works for reception purposes where the feeds receive a signal.

Figure 6:
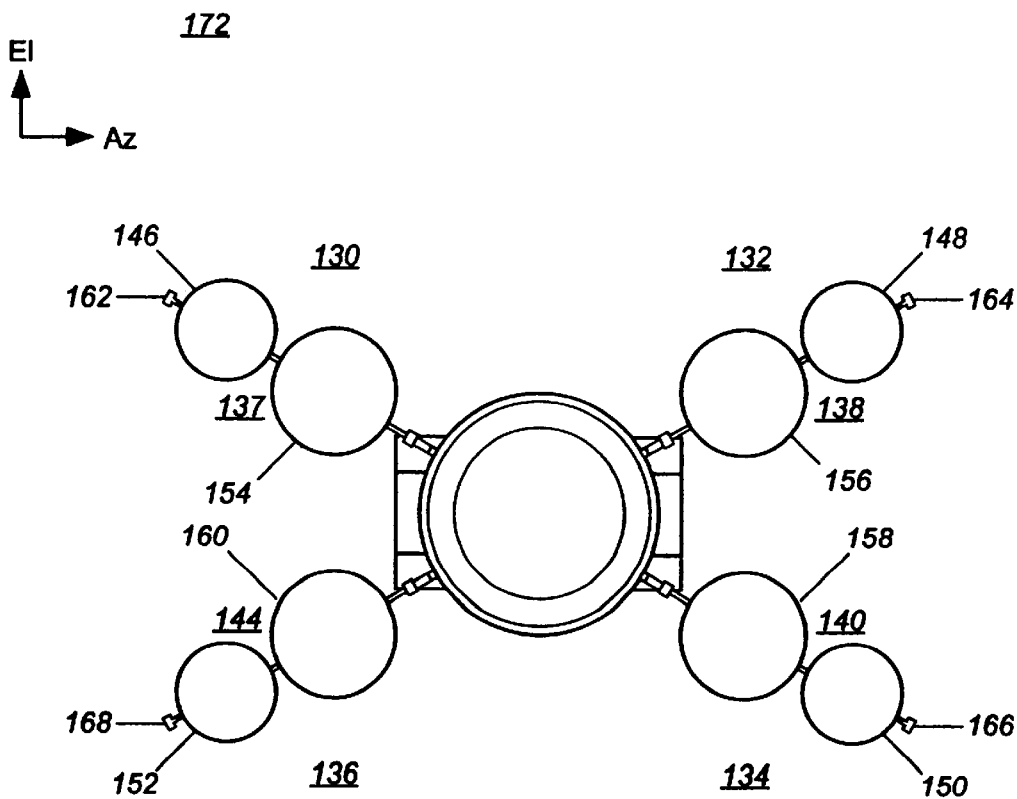
FIG. 6 is a front plane view showing a satellite having a plurality of offset gregorian antennas which together form an offset gregorian antenna system in accordance with a second embodiment of the invention; and, FIG. 7 is a depiction of antenna beams on the Earth provided by the offset gregorian antenna system shown in FIG. 6.

The above described embodiments provide adjacent, symmetrically shaped antenna beams which cover the EFOV from a single offset gregorian antenna. Referring to FIG. 6, for another embodiment of the invention, a plurality of offset gregorian antennas 130–136 provide antenna beams which are interleaved to provide full EFOV coverage. Each antenna 130–136 has a subreflector and main reflector combination 137–144 and a separate feed array 162–168, associated with each subreflector and main reflector combination. Each subreflector and main reflector combination and associated feed array together define a separate offset gregorian cassegrain antenna configuration. Preferably each antenna 130–136 has approximately similarly sized and configured subreflectors 146–152 as well as similarly sized and configured main reflectors 154–160 so that the antenna beams generated by each antenna 130–136 are approximately equivalent.

A separate feed array 162–168 is associated with each subreflector and main reflector combination 137–144. These feed arrays 162–168 are different than the feed array described above in that each feed within a feed array 162–168 is physically larger than the feeds described in the embodiments above, and, each illumination beam is generated by a smaller number of feeds than the embodiment described above. For one embodiment of the invention, each feed in a feed array 162–168 generates one illumination beam instead of a combination of feeds producing an illumination beam. For this embodiment, the feed network (not shown) coupled to each feed array 162–168 can be relatively uncomplicated in that the feed signal producing an illumination beam is not divided between multiple feeds thereby resulting in high gain antenna beams since every division of the feed signal results in signal loss.

The location of each feed within each feed array 162–166 with respect to a subreflector and main reflector combination 137–144 is determined in the same manner as described above. As mentioned above, to provide high gain, adjacently located antenna beams over the EFOV from single feeds would require the feeds to be positioned too close together to be implemented in a single offset gregorian antenna. Therefore, feeds which produce adjacently located antenna beams are positioned within different feed arrays 162–168.

Figure 7:
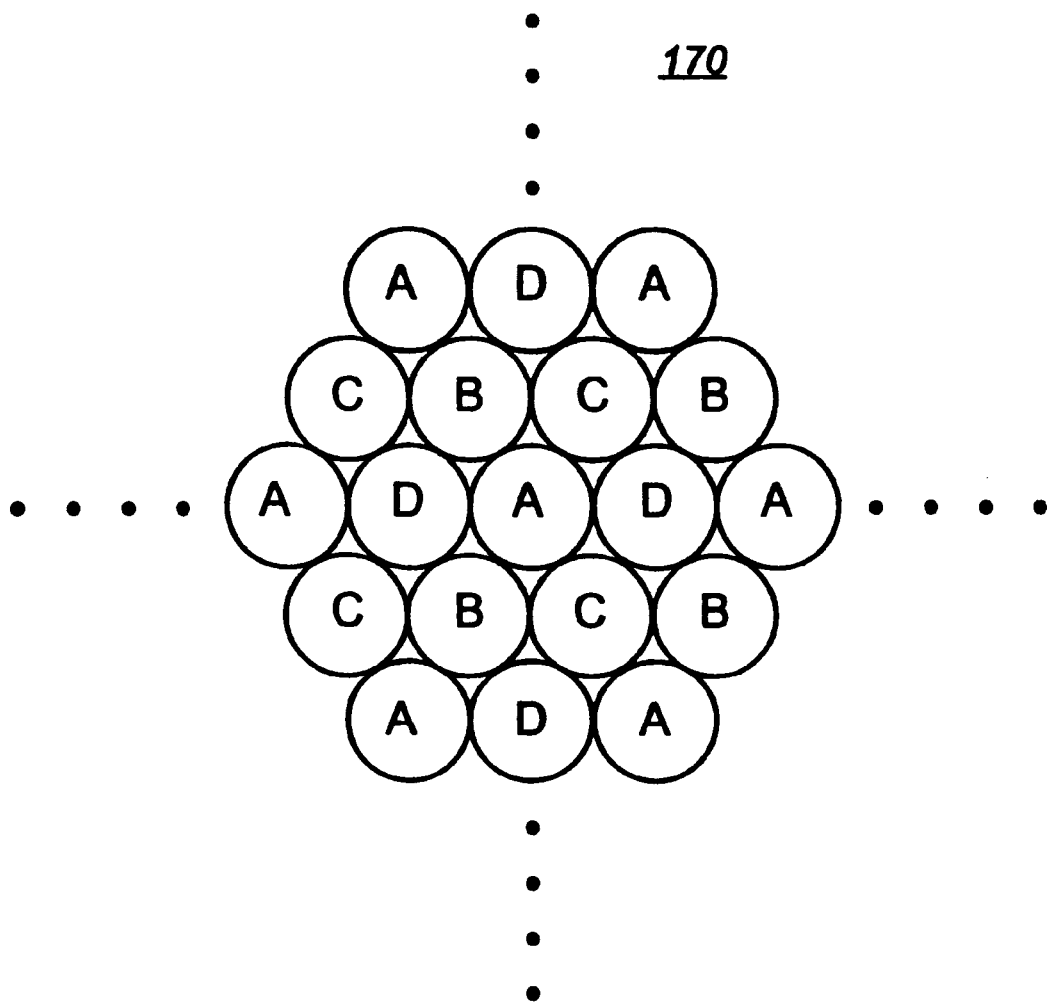

Referring to FIGS. 6 and 7, the antenna beams 170 from each offset gregorian antenna 130–136 are interleaved to provide adjacent antenna beams 170 over the EFOV. No two adjacent antenna beams are created from the same antenna 130–136. FIG. 7 shows a portion of a coverage area on the Earth provided by the system. Only a few of the antenna beams are shown in that the entire coverage area would include many more cells. Each cell is labeled with an A, B, C or D to show which of the four antennas 130–136 actually provided that particular antenna beam. For example, each antenna beam labeled with an "A" is provided from the first antenna 130. Similarly, each antenna beam labeled with a "B", "C", or "D" is provided from the second 132, third 134 and fourth 136 antennas respectively.

The number of offset gregorian antennas 130–136 are chosen so that a feed can physically be located at every desired position so that adjacent beams are provided over the desired coverage area where each beam exhibits the desired beam characteristics such as gain, beamwidth and shape. For the example shown in FIG. 6, four antennas 130–136 are required to position a feed at every location necessary to provide high gain, adjacently located antenna beams 170 over the full EFOV coverage. By using more offset gregorian antennas, the size of the feeds in a feed array can be increased with the desired size and gain of each antenna beam determining the size of each feed and thus the number of antennas needed.

Like the embodiments described above, each feed in a given feed array 162–164 is located at a predetermined position on a contour and configured so that each illumination beam is incident on a preselected location on the subreflector 146–152 and directed towards the main reflector 152–158 within the same subreflector and main reflector combination 137–144 respectively. This embodiment requires additional area on a spacecraft 172 but has the advantage of a relatively uncomplicated, low loss feed network resulting in higher gain antenna beams from the same sized main reflector.

The antenna systems described above offer significant improvements over those antenna systems known in the art for use on satellites. The antenna systems of the invention are able to generate high gain, low scan loss, nearly undistorted, symmetrically shaped antenna beams for many uses, such as cellular satellite global coverage.

It will be appreciated by persons skilled in the art that the present invention is not limited to what has been shown and described hereinabove. The scope of the invention is limited solely by the claims which follow.

What is claimed is:

1. An antenna system for use on a spacecraft comprising:
   a main reflector;
   a subreflector; and,
   a feed array comprised of a plurality of separate feeds arranged in a preselected configuration so that the feeds are aligned along a predetermined contour, said feed array, subreflector and main reflector oriented to define an offset gregorian antenna geometry, each of the feeds provides a separate illumination beam, each feed coupled to a feed network which acts to combine the illumination beams clusters of a preselected number of feeds to produce a single composite illumination beam from each cluster, each composite illumination beam has a central ray which is directed to be incident upon a separate preselected location on said subreflector, the subreflector is configured to receive each composite illumination beam at said predetermined location on said subreflector and direct each said composite illumination beam towards said main reflector, the main reflector is positioned to receive each composite illumination beam from the subreflector and direct each composite illumination beam in a predetermined direction so that each illumination beam forms an antenna beam that impinges a predetermined coverage area on the Earth and each antenna beam defines a separate coverage cell in the coverage area, wherein the position and orientation of the feeds, the subreflector and the main reflector provides antenna beams within a preselected coverage area.

2. An antenna system as in claim 1, wherein said feed network provides a preselected signal intensity and phase weighting of each of the clusters of the preselected number of feeds to define the composite illumination beams in a predetermined manner.

3. An antenna system as in to claim 2, wherein the feeds in the feed array, the subreflector and the main reflector are oriented to provide a plurality of approximately symmetrically shaped antenna beams.

4. An antenna system as in claim 3, wherein said antenna beams are adjacently located on the Earth.

5. An antenna system as in claim 4, wherein said preselected coverage area is an earth field of view from a satellite in a geosynchronous orbit.

6. An antenna system as in claim 5, wherein each said cluster has a central feed horn, adjacent antenna beams being created by clusters having adjacent central feed horns.

7. An antenna system as in claim 6, wherein each cluster of feeds is comprised of seven feeds and each cluster generates a single composite illumination beam.

8. An antenna system as in claim 3, wherein said main reflector further comprises a center point, said central ray of each said composite illumination beam directed to be incident upon said center point.

9. An antenna system as in claim 3, wherein said main reflector, subreflector and feed array are configured so that each said composite illumination beam is directed towards the Earth from said main reflector substantially free of blockage by said subreflector and feed array.

10. An antenna system as in claim 9, wherein said subreflector is greater than approximately 50 wavelengths at a frequency of operation.

11. The antenna system as in claim 10, wherein the configuration of select feeds in the feed array, subreflector and main reflector satisfy a cross-polarization cancellation condition give by $$\tan\frac{\gamma}{2} = \frac{1}{M} \times \tan\frac{\varphi}{2},$$

where $\gamma$ is the angle from the main reflector axis to the subreflector axis, $\phi$ is the angle from the subreflector axis to the focal axis, and M is the magnification factor.

12. An antenna system for a satellite comprising:

a plurality of subreflector and main reflector combinations; and, a feed array associated with each subreflector and main reflector combination, wherein each subreflector and main reflector combination and associated feed array is oriented to define a separate offset gregorian geometry, each said subreflector and main reflector combination and associated feed array together comprising an offset gregorian antenna, each said feed array is comprised of a plurality of feeds which generate a plurality of illumination beams each of which having a central ray, the feeds of each said feed array are positioned so that the central ray of each illumination beam is directed towards a separate preselected location on one of the subreflectors, each subreflector configured to direct each illumination beam towards the main reflector within the same offset gregorian antenna, each main reflector directs each illumination beam in a predetermined direction so that each illumination beam generates an antenna beam which impinges a predetermined coverage area on the Earth, wherein the antenna beams define separate coverage cells in a coverage area, wherein the coverage cells are arranged so that no coverage cell defined by an antenna beam generated from an illumination beam from one subreflector and main reflector combination is contiguous with another coverage cell defined by another antenna beam generated from an illumination beam from the same subreflector and main reflector combination.

13. An antenna system as in to claim 12, wherein each offset gregorian antenna is oriented to provide a plurality of approximately equivalent antenna beams.

14. An antenna system as in claim 13, wherein each offset gregorian antenna is configured to provide a plurality of approximately symmetrically shaped antenna beams.

15. An antenna system as in claim 14, wherein said antenna beams are adjacently located on the Earth.

16. An antenna system as in claim 15, wherein each main reflector and subreflector combination and associated feed array are configured so that each said illumination beam is directed towards the Earth from said main reflector substantially free of blockage by said subreflector and feed array.

17. An antenna system as in claim 16, wherein said preselected coverage is an earth field of view from a satellite in a geosynchronous orbit.

18. An antenna system as in claim 17, wherein each feed in each feed array provides a separate illumination beam.

19. The antenna system as in claim 12, wherein the configuration of each offset gregorian antenna satisfy a cross-polarization cancellation condition given by $$\tan\frac{\gamma}{2} = \frac{1}{M} \times \tan\frac{\varphi}{2},$$

where $\gamma$ is the angle from the main reflector axis to the subreflector axis, $\phi$ is the angle from the subreflector axis to the focal axis, and M is the magnification factor.

20. An antenna system as in claim 12, wherein each said main reflector further comprises a center point, said central ray of each said illumination beam directed to be incident upon said center point.

* * * * *